United States Patent
Konrad et al.

(10) Patent No.: US 12,059,879 B2
(45) Date of Patent: Aug. 13, 2024

(54) DOUBLE BELT PRESS LAMINATING MACHINE WITH EDGE STRIP BANDS FOR MANUFACTURING WATERPROOFING MEMBRANES

(71) Applicant: CARLISLE CONSTRUCTION MATERIALS, LLC, Carlisle, PA (US)

(72) Inventors: Michael Konrad, Hamburg (DE); Josef Sochor, Hamburg (DE); Bruno Bauer, Hamburg (DE)

(73) Assignee: CARLISLE CONSTRUCTION MATERIALS, LLC, Carlisle, PA (US)

( * ) Notice: Subject to any disclaimer, the term of this patent is extended or adjusted under 35 U.S.C. 154(b) by 0 days.

(21) Appl. No.: 18/096,469

(22) Filed: Jan. 12, 2023

(65) Prior Publication Data
US 2023/0226810 A1 Jul. 20, 2023

Related U.S. Application Data

(60) Provisional application No. 63/300,768, filed on Jan. 19, 2022.

(51) Int. Cl.
*B32B 37/10* (2006.01)
*B32B 37/00* (2006.01)

(52) U.S. Cl.
CPC ...... *B32B 37/1027* (2013.01); *B32B 37/0046* (2013.01)

(58) Field of Classification Search
None
See application file for complete search history.

(56) References Cited

U.S. PATENT DOCUMENTS

| 4,579,612 A | 4/1986 | Held | |
| 4,844,766 A * | 7/1989 | Held | B29C 43/228 264/172.19 |

(Continued)

FOREIGN PATENT DOCUMENTS

| CN | 103436973 B | * 12/2015 |
| DE | 1779040 A1 | 1/1972 |

(Continued)

OTHER PUBLICATIONS

DE29622385U1_machine_translation (Year: 1997).*

(Continued)

*Primary Examiner* — Michael N Orlando
*Assistant Examiner* — Abhishek A Patwardhan
(74) *Attorney, Agent, or Firm* — David R. Heckadon; Gordon Rees Scully Mansukhani LLP

(57) ABSTRACT

A system for manufacturing waterproofing membranes, including: a laminating machine; a textile belt moveable through the laminating machine; and a pair of edge strips positioned adjacent to opposite sides of the textile belt. A first polymer is unrolled onto the textile belt and positioned between a pair of edge strips positioned adjacent to opposite sides of the textile belt and then moved through the laminating machine to heat and cure the first polymer into a first waterproofing membrane. The edge strips are preferably endless loops of material that pass continuously through the laminating machine. A second polymer can also be unrolled onto an opposite side of the textile belt such that two different waterproofing membranes can be manufactured simultaneously.

12 Claims, 7 Drawing Sheets

(56) References Cited

U.S. PATENT DOCUMENTS

| | | | |
|---|---|---|---|
| 5,141,583 A * | 8/1992 | Held | B29C 70/504 |
| | | | 425/371 |
| 2018/0022045 A1 | 1/2018 | Sebastian et al. | |
| 2021/0153348 A1 | 5/2021 | Tachibana et al. | |
| 2021/0207378 A1* | 7/2021 | Dzenis | B32B 7/12 |

FOREIGN PATENT DOCUMENTS

| | | |
|---|---|---|
| DE | 29622385 U1 | 6/1997 |
| EP | 0554796 A1 | 8/1993 |

OTHER PUBLICATIONS

CN103436973B_machine_translation (Year: 2013).*
United States International Searching Authority, International Search Report and Written Opinion for corresponding International Application No. PCT/US2023/010710, mailed Apr. 13, 2023, 10 pages.

* cited by examiner

DOUBLE BELT PRESS LAMINATING MACHINE WITH EDGE STRIP BANDS FOR MANUFACTURING WATERPROOFING MEMBRANES

RELATED APPLICATION

The present application claims priority to U.S. Provisional Patent Application Ser. No. 63/300,768, of same title, filed Jan. 19, 2022, the entire disclosure of which is incorporated herein by reference in its entirety for all purposes.

TECHNICAL FIELD

The present system relates to production lines for manufacturing waterproofing membranes using laminating machines.

SUMMARY OF THE INVENTION

The present system for manufacturing waterproofing membranes preferably comprises: a laminating machine; a textile belt being moveable through the laminating machine between upper and lower conveyor belts in the laminating machine; and a pair of edge strips or belts positioned adjacent to opposite sides of the textile belt. The laminating machine has an upper conveyor belt with an upper heat source adjacent to the upper conveyor belt. The laminating machine also has a lower conveyor belt with a lower heat source adjacent to the lower conveyor belt. The edge strips or belts are moveable together with the textile belt through the laminating machine with the edge strips moving in a path between the upper and lower conveyor belts. In various preferred embodiments, the edge strips can be positioned onto rollers which position them to pass between the upper and lower heat sources. In some optional embodiments, the edge strips can be positioned directly on top of the upper or lower conveyor belts.

Preferably, the edge strips or belts are each made of endless loops of material that pass continuously through the laminating machine. In preferred aspects, the textile belt is preferably unwound from a first roller and passes through the laminating machine and then is re-wound onto a second roller. A first polymer is fed through the laminating machine with the polymer positioned against the textile belt. This first polymer is also positioned between the pair of edge strips, with the edge strips being on either side (for example, at the side edges of the textile belt). For example, the polymer can be unwound from a first roller, placed on top of the textile belt which is then fed through the laminating machine (such that it can be cured or vulcanized into a waterproofing membrane) and then separated from the textile belt and re-wound onto a second roller (after exiting the laminating machine). In alternate aspects, the polymer may be sprayed or otherwise spread onto the top of the textile belt.

Optionally, a second polymer can be placed on an opposite side (e.g.: the underside) of the textile belt from the first polymer such that the first and second polymers can be fed through the laminating machine simultaneously (i.e.: with the first polymer sitting on top of the textile belt and the second polymer sitting below and adjacent to the textile belt). A similar method of unwinding the second polymer from a first roller, passing it through the laminating machine (and thereby curing it into a second waterproofing membrane on the underside of the textile belt) and then re-winding it on a second roller as described above with respect to the first polymer can be used.

The first and/or second polymer(s) used in the present system can optionally be made of EPDM (Ethylene-propylene diene monomer), the textile belt can optionally be a polyester scrim PET (Polyethylene Terephthalate), and the upper and lower conveyor belts can optionally be made of steel. The edge strips can optionally be made of bands of silicone rubber or butyl. It is to be understood, however, that other suitable materials can also be used for these various parts of the present system, all keeping within the scope of the presently claimed system.

The present system also includes a preferred method of manufacturing one or two waterproofing membranes, comprising: unrolling or otherwise placing a first polymer onto a textile belt; positioning the first polymer between a pair of edge strips or belts positioned adjacent to opposite side edges of the textile belt; moving the textile belt and first polymer together through a laminating machine that heats and cures or vulcanizes the first polymer into a first waterproofing membrane; and then rolling up the first waterproofing membrane after the first waterproofing membrane exits the laminating machine. In addition, a second waterproofing membrane can be made on the underside of the textile belt using a second polymer.

As will be explained herein, one advantage of the present edge strips is that they assist the formed waterproofing membrane(s) in having solid, well-formed side edges by preventing the polymer(s) from thinning at their edges as they pass through the laminating machine.

DETAILED DESCRIPTION OF THE DRAWINGS

Figure 1:
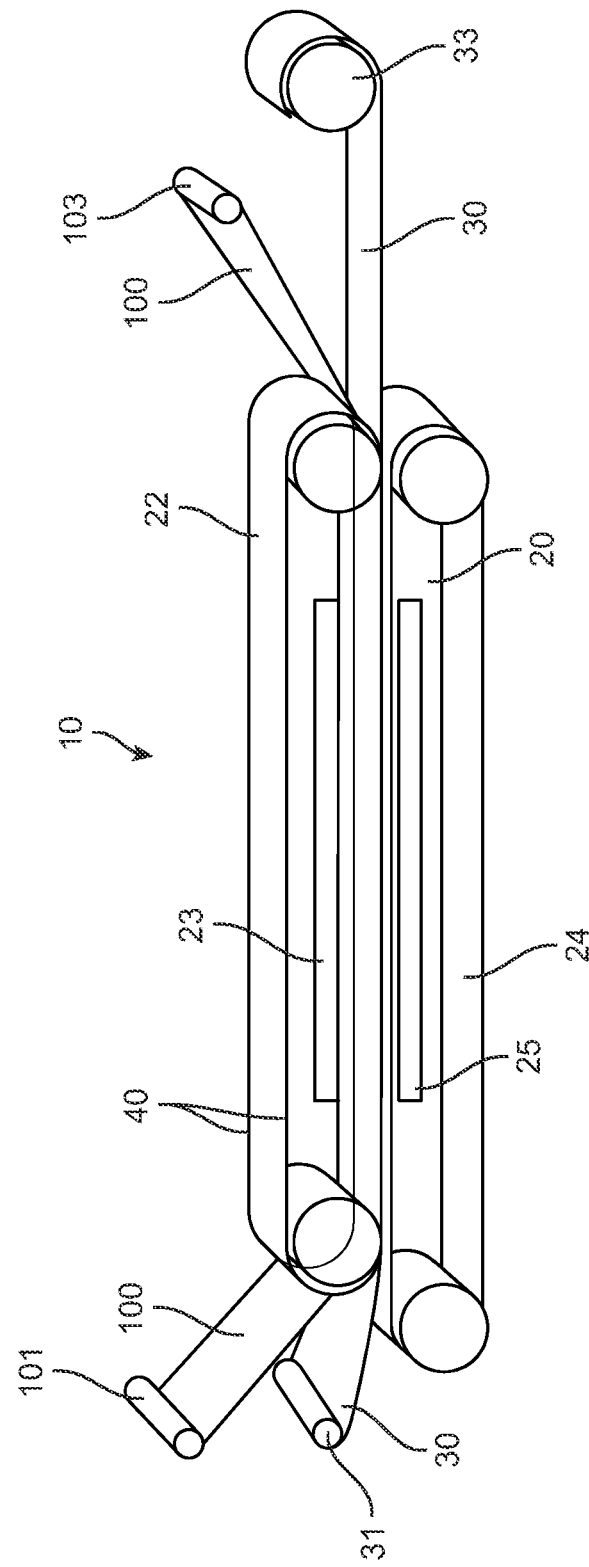
FIG. 1 is a perspective representation the present laminating system used to produce a single waterproofing membrane. In this first embodiment, the edge strips are positioned directly on top of the upper conveyor belt and wrap around the upper conveyor belt.

FIG. 1 is a schematic illustration of the present lamination system used to produce a single waterproofing membrane. As seen in FIG. 1, system 10 comprises a laminating machine 20 and a textile belt 30 which is moveable through laminating machine 20. Laminating machine 20 preferably comprises: an upper conveyor belt 22, an upper heat source 23 adjacent to the upper conveyor belt 22, a lower conveyor belt 24, and a lower heat source 25 adjacent to the lower conveyor belt 24. In this embodiment, a pair of edge strips 40 are positioned directly on top of upper conveyor belt 22, and move together with upper conveyor belt 22.

Figure 2:
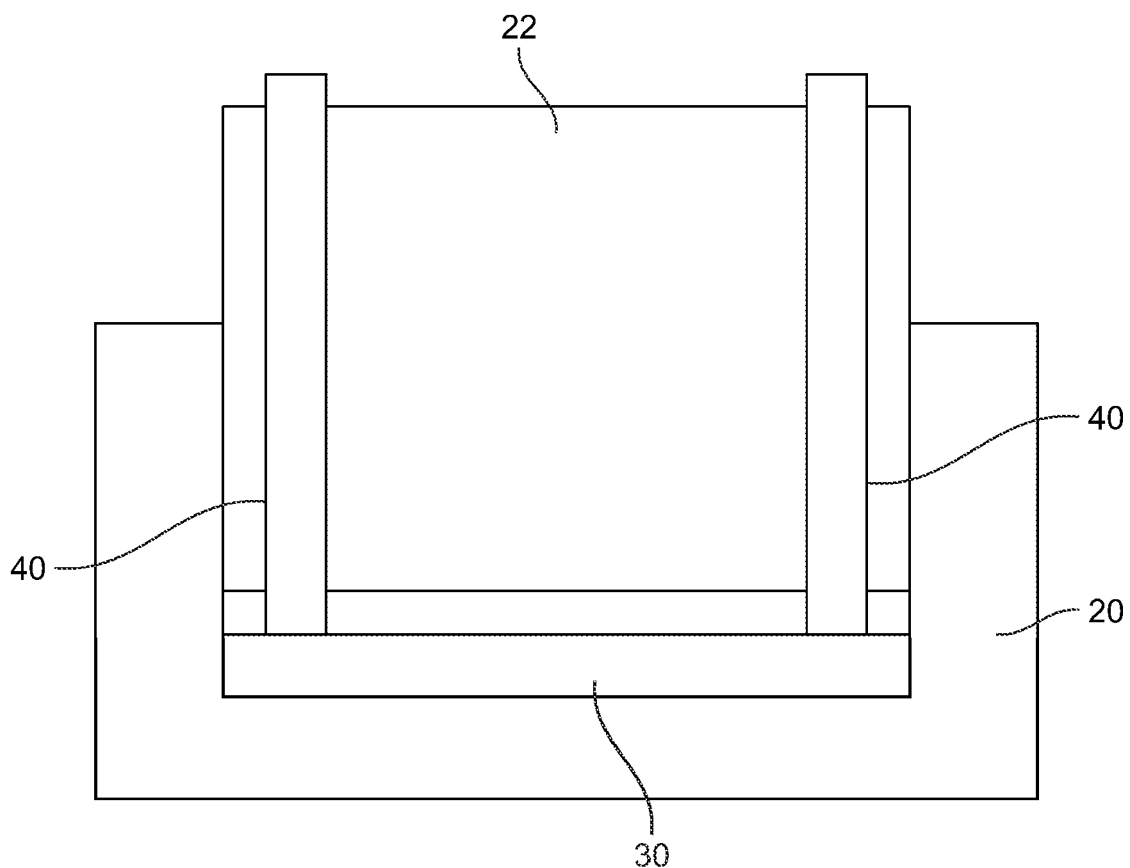
FIG. 2 is a front end view of the laminating assembly of the system of FIG. 1 producing a single waterproofing membrane.

FIG. 2 shows a front end view corresponding to FIG. 1, showing the textile belt 30 (shown in section) and the upper conveyor belt 20 entering the laminating machine 20. The edge strips 40 that sit on top of upper conveyor belt 20 can also be seen.

Figure 3:
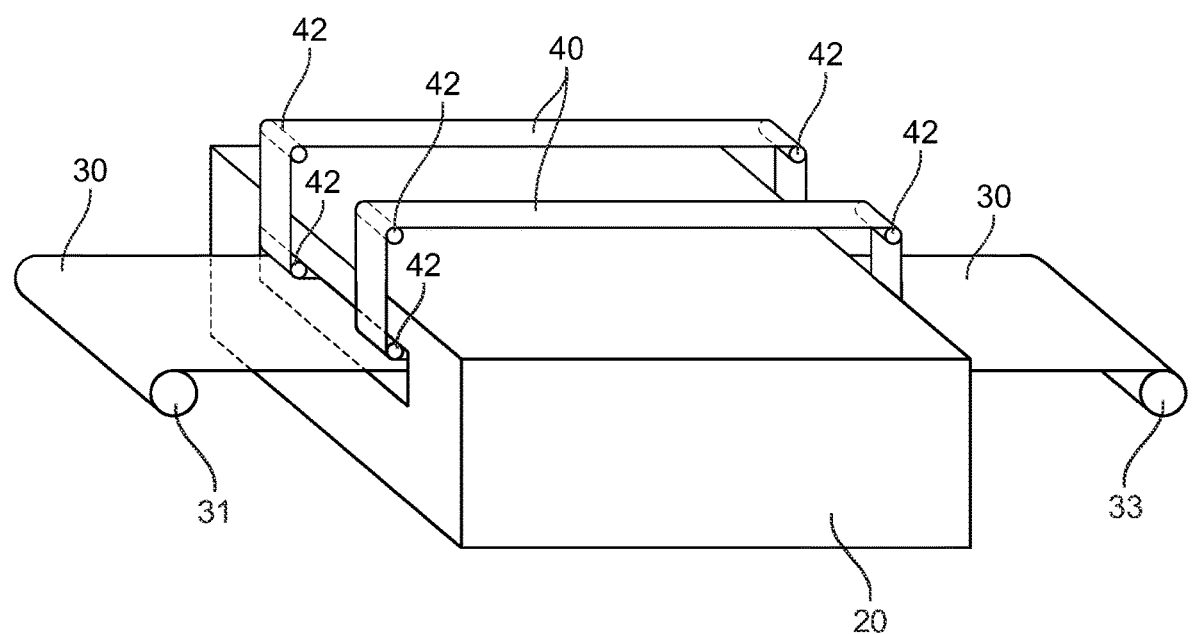
FIG. 3 is a perspective view of an alternate embodiment in which the edge strips travel on rollers through the laminating machine and travel above the laminating machine on their return.

FIG. 3 shows a second embodiment of the laminating system in which edge strips 40 are instead a pair of endless loops of material that pass around rollers 40. As such, edge strips 40 move together with textile belt 30 when they pass through laminator 20.

Figure 4:
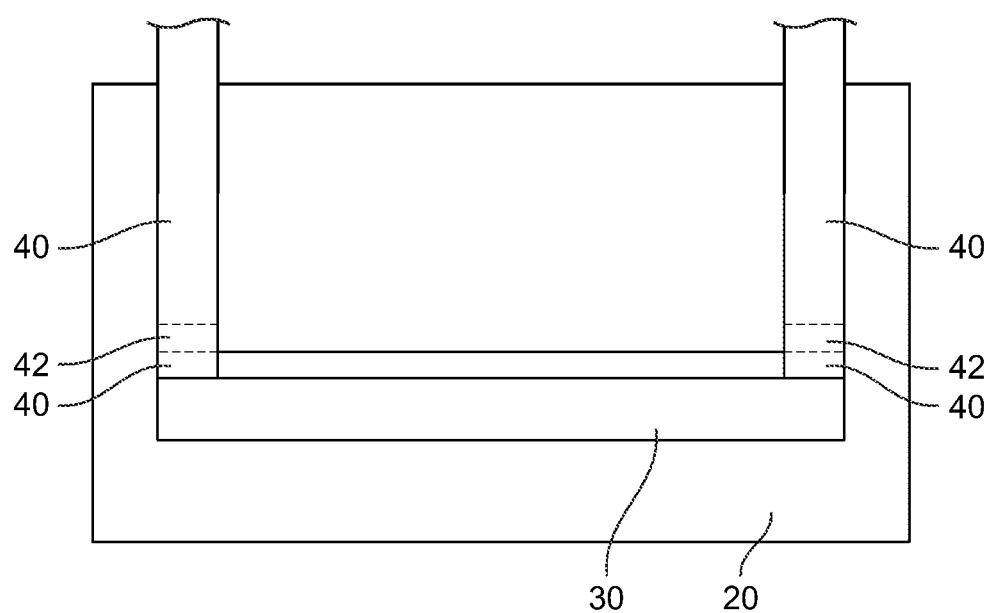
FIG. 4 is a front end view of the edge strip placement on top of the textile belt corresponding to the embodiment of FIG. 3.

FIG. 4 shows a front end view corresponding to FIG. 3, showing the textile belt 30 (shown in section) and the edge strips 40 being fed around rollers 42 and into the laminator.

As seen in FIGS. 1 to 4, edge strips 40 are positioned adjacent to opposite side edges of the textile belt 30. Edge strips 40 are moveable along together with textile belt 30 through the laminating machine 20, with the edge strips 40 being pulled through the laminating machine 20 by the movement of upper and lower conveyor belts 22 and 24.

FIG. 3 is a perspective view of the system in operation. As can be seen in this embodiment, edge strips 40 may be endless loops of material that pass continuously through the laminating machine 20. A plurality of rollers 42 can be provided to position edge strips 40. Rollers 42 may be positioned above, in front of and behind laminator 20 as shown. (It is to be understood that these Figures are schematic representations only. For clarity, not all working parts of the present system are illustrated).

Figure 5:
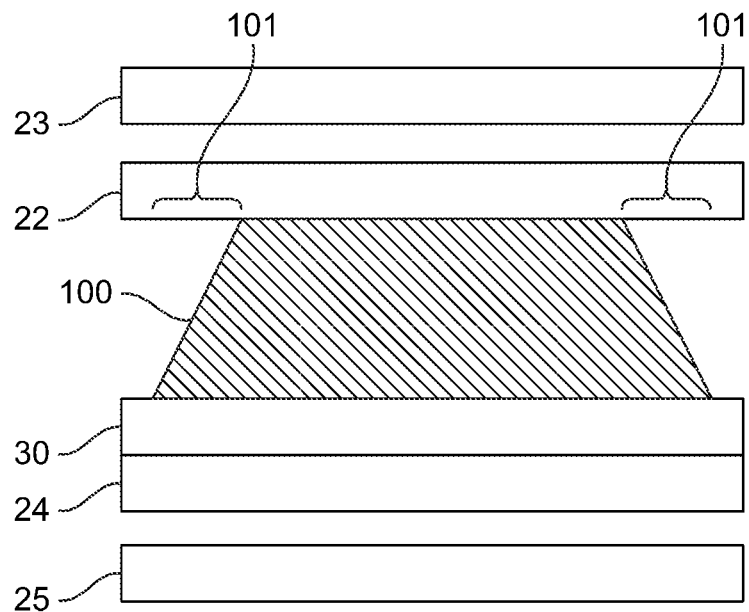
FIG. 5 is a sectional illustration of a first polymer on top of the textile belt in the absence of edge strips.
Figure 6:
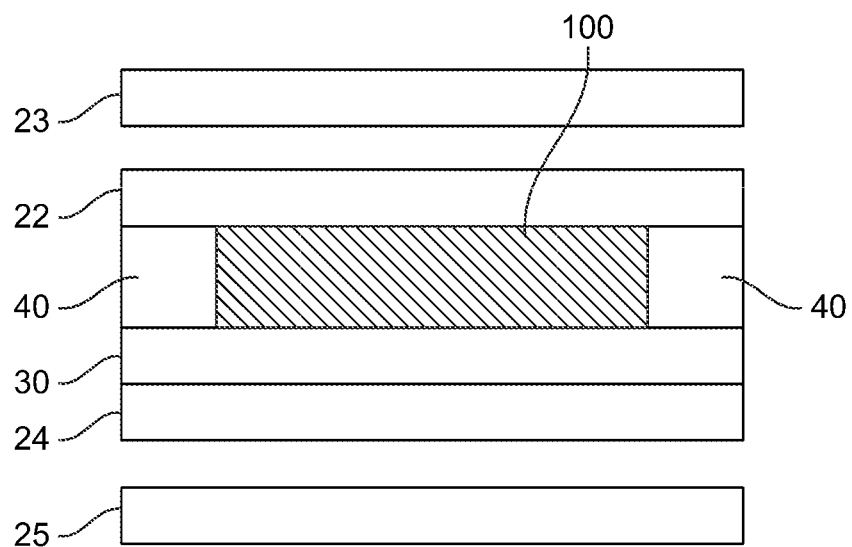
FIG. 6 corresponds to FIG. 5, but with the present edge strips added, thereby showing the advantage of the present edge strips.

Next, FIGS. 5 and 6 show placement of a first polymer 100 on top of the textile belt 30. Together, first polymer 100 and textile belt 30 are fed through laminating machine 20 by the movement of conveyor belts 22 (positioned above) and 24 (positioned below textile belt 30).

In operation, heat from upper and lower heat sources 23 and 25 will cause first polymer 100 to cure and form a waterproofing membrane when passing through laminating machine 20. FIG. 5 illustrates the existing problem encountered prior to the present system adding edge strips 40. Specifically, the sides 101 of first polymer 100 tend to spread out and flatten as illustrated. Although the laminating machine 20 passes polymer 100 therethrough at a predefined speed, pressure and temperature, the flow of the EPDM material at side edges 101 can lead to pressure and thickness losses at these side edges. Moreover, this sort of pressure losses at the side edges 101 of the polymer 100 can lead to pressure losses in the middle area of the membrane. Taken together, these pressure losses can lead to foamed areas inside the final waterproofing membrane (both across the width of membrane 100 to some degree, but more commonly at the side edges 101 of the membrane). As a result, the prior practice in the industry was simply to cut away and remove side edges 101 of the final waterproofing membrane 100. Unfortunately, this was a time consuming "solution" which simply wasted material. In addition, this "solution" did not solve the problem is the membrane being poorly formed in its mid-section due to pressure losses caused by the flattening out of the polymer at its side edges 101.

What is instead desired is a system that maintains a more uniform pressure and thickness of polymer 100 across its width as it passes through laminating machine 20. In accordance with the present system, therefore, and as illustrated in FIG. 6, edge strips 40 rest on top of upper conveyor belt 22 (in the embodiment of FIG. 1) or rest on top of textile belt 30 (in the embodiment of FIG. 3) and provide solid edges such that first polymer 100 sets with well-formed vertical edges. As a result, the thickness of first polymer 100 remains uniform from side to side as it passes through laminating assembly 20 and is cured.

Figure 7:
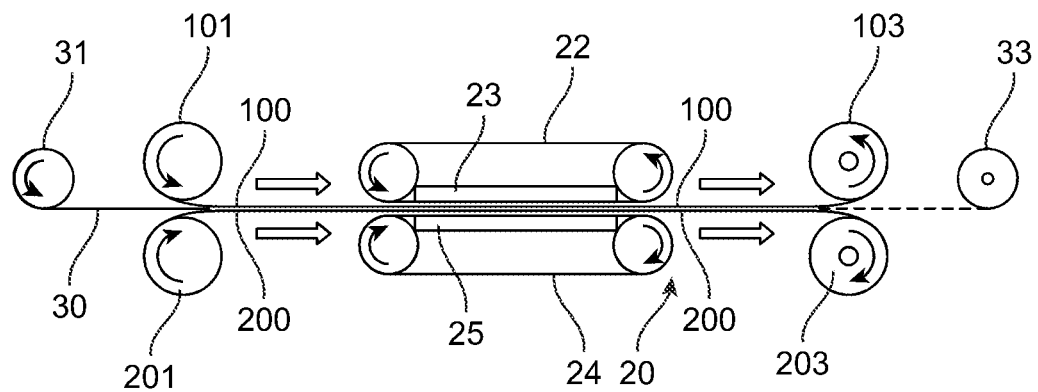
FIG. 7 is a side elevation view of the laminating assembly of the system of FIG. 1 producing a pair of waterproofing membranes.
Figure 8:
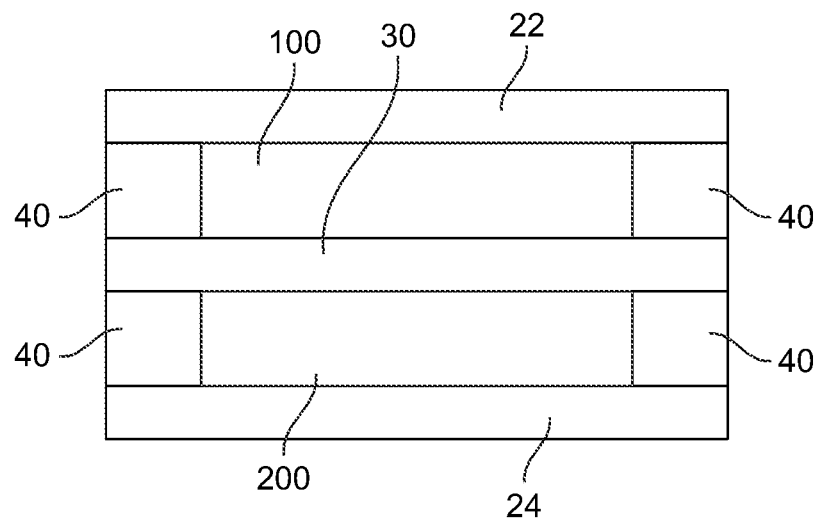
FIG. 8 is a sectional illustration corresponding to FIG. 7 showing the first polymer sitting on top of the textile belt and the second polymer positioned underneath the textile belt with edge strips both above and below the textile belt.

FIGS. 7 and 8 illustrate an optional embodiment of the present system in which rolls of two different polymers 100 and 200 are used to simultaneously produce two different waterproofing membranes. FIG. 8 is a sectional illustration corresponding to FIG. 7 showing the first polymer 100 on top of the textile belt 30 and the second polymer 200 positioned right under the textile belt 30. In this optional embodiment, edge strips 40 are positioned both above and below textile belt 30.

As seen in FIGS. 1 and 7, textile belt 30 can be unwound from a first roller 31, pass through the laminating machine 20 and then be re-wound onto a second roller 33. Similarly, first polymer 100 can be unwound from a first roller 101, placed on top of the textile belt 30, fed through laminating machine 20, be separated from the textile belt 30 and then be re-wound onto a second roller 103. The second polymer 200 can be unwound from a first roller 201 and re-wound onto a second roller 203.

In preferred aspects, the first and optional second polymers 100 and 200 may be made of EPDM. It is to be understood that other suitable polymer materials can also be used. Textile belt 30 may optionally be a polyester scrim PET. Similarly, other suitable belt materials can be used instead, including but not limited to an aramid such as Kevlar®. Upper and lower conveyor belts 22 and 24 may optionally be made of steel, however other suitable materials can also be used for these conveyor belts as well. Lastly, edge strips 40 may be made of silicone rubber or butyl, but other suitable materials could also be used instead.

The present system also includes the preferred method of manufacturing one or two waterproofing membranes, comprising: unrolling (or otherwise depositing) a first polymer 100 onto a textile belt 30; positioning the first polymer 100 between a pair of edge strips 40 positioned adjacent to opposite sides of the textile belt 30; moving textile belt 30 and first polymer 100 together through a laminating machine 20 which heats and cures first polymer 100 into a first waterproofing membrane. The first waterproofing membrane can then preferably be rolled up after it exits the laminating machine. Preferably, edge strips 40 move together along with textile belt 30 (and the upper conveyor belt 22) through the laminating machine. Optionally, the present method includes unrolling (or otherwise placing) a second polymer 200 onto the bottom side of textile belt 30 such that second polymer 200 is positioned between another pair of edge strips 40 on opposite sides of textile belt 30. Second polymer 200 is then also passed through laminating machine 20 such that the laminating machine heats and cures second polymer 2000 into a second waterproofing membrane. The second waterproofing membrane can then be rolled up it exits the laminating machine.

It is to be understood that strips/belts 40 described herein need not be endless loops of material as illustrated. Instead, they may be long cords of material that are simply fed into one end of the laminating assembly, and then retrieved from the other end of the laminating assembly for re-use. In one exemplary embodiment, strips/belts 40 can be made of small diameter silicon cables. These cables 40 can be fed (e.g.: unwound) from a drum passing into the laminating machine and then re-wound onto another drum at the exit of the laminating machine for re-use.

It is also to be understood that edge strips 40 need not be positioned at the exact opposite side edges of the belt. Rather, edge strips 40 can be positioned somewhat spaced apart from the side edges of the belt. It is to be understood that the present system encompasses embodiments where the edge strips are positioned at any location across the width of the belt. Moreover, the present system also encompasses embodiments having more than two edge strips. For example, multiple edge strips (e.g.: more than two) can be positioned at different locations across the width of the belt when making more than one waterproofing membrane strips side by side in the same laminator (for example when spraying the first polymer onto the top of the belt passing through the laminator.

Lastly, it is to be understood that the belt need not be made from textile, and that the present system encompasses all embodiments of transport belts however formed and of all suitable materials.

What is claimed is:

1. A system for manufacturing waterproofing membranes, comprising:
    a laminating machine, comprising:
        an upper conveyor belt,
        an upper heat source adjacent to the upper conveyor belt,
        a lower conveyor belt, and
        a lower heat source adjacent to the lower conveyor belt,
    a transport belt moveable through the laminating machine between the upper and lower conveyor belts; and
    a pair of edge strips positioned adjacent to opposite sides of the transport belt, the edge strips being moveable with the transport belt through the laminating machine between the upper and lower conveyor belts, wherein each of the edges strips has a top face in full contact with the upper conveyor belt and a bottom face in full contact with the transport belt, and wherein the edge strips:
        are positioned directly on top of the upper conveyor belt and wrap around the upper conveyor belt, or
        pass continuously around a plurality of dedicated rollers that position the edge strips on the upper conveyor belt, wherein the edge strips wrap around the upper conveyor belt.
2. The system of claim 1, wherein the transport belt is a textile belt.
3. The system of claim 1, wherein the edge strips are endless loops of material that pass continuously through the laminating machine.
4. The system of claim 1, wherein the edge strips are cords that are fed into one end of the laminating machine, and then are retrieved after passing through the laminating machine.
5. The system of claim 1, wherein the transport belt is unwound from a first roller, passes through the laminating machine and then is re-wound onto a second roller.
6. The system of claim 1, further comprising:
    a first polymer that is fed through the laminating machine positioned against the transport belt and positioned between the pair of edge strips.
7. The system of claim 6, wherein the first polymer is unwound from a first roller, placed against the transport belt, fed through the laminating machine and then separated from the transport belt and re-wound onto a second roller.

8. A system for manufacturing waterproofing membranes, comprising:
    a laminating machine, comprising:
        an upper conveyor belt,
        an upper heat source adjacent to the upper conveyor belt,
        a lower conveyor belt, and
        a lower heat source adjacent to the lower conveyor belt,
    a transport belt moveable through the laminating machine between the upper and lower conveyor belts;
    first and second pairs of edge strips positioned adjacent to opposite sides of the transport belt, the first and second pairs of edge strips being moveable with the transport belt through the laminating machine between the upper and lower conveyor belts; and
    a first polymer that is fed through the laminating machine positioned against the transport belt and positioned between the first pair of edge strips,
    a second polymer that is fed through the laminating machine positioned against the transport belt and positioned between the second pair of edge strips, and
    wherein the first and second polymers are positioned on opposite sides of the transport belt, and wherein the first pair of edge strips:
        is positioned directly on top of the upper conveyor belt and wrap around the upper conveyor belt, or
        passes continuously around a plurality of dedicated rollers that position the edge strips on the upper conveyor belt, wherein the edge strips wrap around the upper conveyor belt.
9. The system of claim 6, wherein the first polymer is EPDM.
10. The system of claim 9, wherein the first and second polymers are positioned above and below the transport belt and the transport belt is positioned laterally between the edge strips.
11. A system for manufacturing waterproofing membranes, comprising:
    a laminating machine, comprising:
        an upper conveyor belt,
        an upper heat source adjacent to the upper conveyor belt,
        a lower conveyor belt, and
        a lower heat source adjacent to the lower conveyor belt,
    a transport belt moveable through the laminating machine between the upper and lower conveyor belts; and
    a pair of edge strips positioned adjacent to opposite sides of the transport belt, the edge strips being moveable with the transport belt through the laminating machine between the upper and lower conveyor belts, wherein each of the edges strips has a top face in full contact with the upper conveyor belt and a bottom face in full contact with the transport belt, wherein the transport belt is a polyester scrim PET, and wherein the edge strips:
        are positioned directly on top of the upper conveyor belt and wrap around the upper conveyor belt, or
        pass continuously around a plurality of dedicated rollers that position the edge strips on the upper conveyor belt, wherein the edge strips wrap around the upper conveyor belt.
12. The system of claim 1, wherein the edge strips are made of silicone rubber or butyl.

* * * * *